United States Patent [19]
Kamitani et al.

[11] Patent Number: 6,096,177
[45] Date of Patent: Aug. 1, 2000

[54] ELECTROLYZED WATER PRODUCTION APPARATUS

[75] Inventors: Yoshinori Kamitani, Nagoya; Hiroki Yamaguchi; Fumiyuki Hori, both of Toyoake, all of Japan

[73] Assignee: Hoshizaki Denki Kabushiki Kaisha, Tokoake, Japan

[21] Appl. No.: 09/097,822

[22] Filed: Jun. 16, 1998

[51] Int. Cl.⁷ .............................. C25B 15/00; C25B 9/00
[52] U.S. Cl. .................................... 204/241; 204/274
[58] Field of Search ................................ 205/274, 275, 205/276; 204/230.2, 241, 274

[56] References Cited

U.S. PATENT DOCUMENTS

| | | | |
|---|---|---|---|
| 4,119,520 | 10/1978 | Paschakarnis et al. | 204/276 |
| 4,171,256 | 10/1979 | Themy | 204/239 |
| 5,094,734 | 3/1992 | Torrado | 204/234 |
| 5,244,558 | 9/1993 | Chiang | 204/241 |
| 5,399,251 | 3/1995 | Nakamats | 204/262 |
| 5,904,999 | 5/1999 | Kimberg et al. | 429/27 |

FOREIGN PATENT DOCUMENTS

| | | | |
|---|---|---|---|
| 54006898 | 6/1977 | Japan | C25B 1/34 |
| 6-262172 | 3/1993 | Japan . | |

*Primary Examiner*—Donald R. Valentine
*Attorney, Agent, or Firm*—Arent Fox Kintner Plotkin & Kahn

[57] ABSTRACT

An electrolyzed water production apparatus of the type which includes an electrolytic cell provided therein with a set of electrodes for producing electrolyzed water by electrolysis of brine, a water supply conduit for supply of the brine into the electrolytic cell, a discharge conduit for introducing the electrolyzed water into a storage tank, a controller box formed to contain therein an electric power source device and its accessory parts for applying DC voltage between the electrodes and an electric blower for cooling the power source device and its accessory parts, and a cabinet formed to contain the electrolytic cell, water supply conduit, discharge conduit and controller box, wherein the blower is arranged in the controller box to circulate cooling air in the interior of the cabinet through a water system composed of at least one of the electrolytic cell, water supply conduit and discharge conduit.

7 Claims, 5 Drawing Sheets

ELECTROLYZED WATER PRODUCTION APPARATUS

BACKGROUND OF THE INVENTION

1. Field of the Invention

The present invention relates to an electrolyzed water production apparatus, and more particularly to an apparatus for producing electrolyzed water by electrolysis of brine in an electrolytic cell.

2. Description of the Prior Art

In the field of this kind of apparatuses, there has been proposed an electrolyzed water production apparatus of the type which includes an electrolytic cell provided therein with a set of electrodes for electrolyzing diluted brine into acid-ion water and alkaline-ion water, a water supply conduit for supply of the diluted brine into the electrolytic cell, discharge conduits for introducing the electrolyzed water respectively into an acid-ion water tank and an alkaline-ion water tank, a controller box provide therein with an electric power source device and its accessory parts for applying DC voltage between the electrodes, and an electric blower for cooling the accessory parts of the power source device. In such a conventional apparatus, all the component parts of the apparatus are contained within a cabinet as shown in FIG. 10, wherein the cabinet is provided at its front panel with an air intake for introducing fresh air into the cabinet for cooling the power source device and its accessory parts and at its rear panel with a vent-hole located at a position opposed to the air intake.

In such arrangement of the component parts in the cabinet, it is required to provide an air filter at the intake for preventing entry of contaminants, dusts, oil, etc. into the interior of the cabinet. The air filter must be cleaned or replaced with a new one for maintenance of the electrolyzed water production apparatus. In addition, when the apparatus is placed at a desired position, it is needed to position the cabinet in such a manner that the vent-hole is spaced in an appropriate distance from a side wall adjacent thereto.

SUMMARY OF THE INVENTION

It is, therefore, a primary object of the present invention to provide an electrolyzed water production apparatus wherein a water system composed of component parts indispensable for the apparatus is utilized to cool a power source device and its accessory parts without providing any additional parts such as an air filter.

According to the present invention, there is provided an electrolyzed water production apparatus which includes an electrolytic cell provided therein with a set of electrodes for producing electrolyzed water by electrolysis of brine, a water supply conduit for supply of the brine into the electrolytic cell, a discharge conduit for introducing the electrolyzed water into a storage tank, a controller box formed to contain therein an electric power source device and its accessory parts for applying DC voltage between the electrodes and an electric blower for cooling the power source device and its accessory parts, and a cabinet formed to contain the electrolytic cell, the water supply conduit, the discharge conduit and the controller box, wherein the blower is arranged in the controller box to circulate cooling air in the interior of the cabinet through a water system composed of at least one of the electrolytic cell, water supply conduit and discharge conduit.

According to an aspect of the present invention, the electrolytic cell is arranged to cool the cooling air circulated therethrough, wherein the electrolytic cell is formed at its outer periphery with heat absorption fins.

According to another aspect of the present invention, a hydraulic pump for supply of water to the water system is arranged to cool the cooling air circulated therethrough, wherein a housing of the hydraulic pump is formed at its outer periphery with heat absorption fins.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
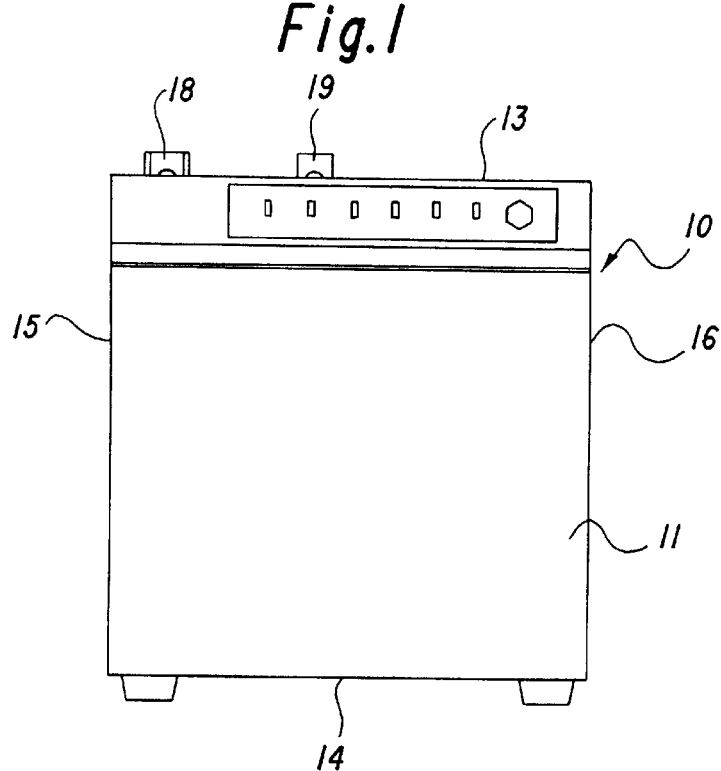
FIG. 1 is a front view of an electrolyzed water production apparatus in accordance with the present invention.
Figure 2:
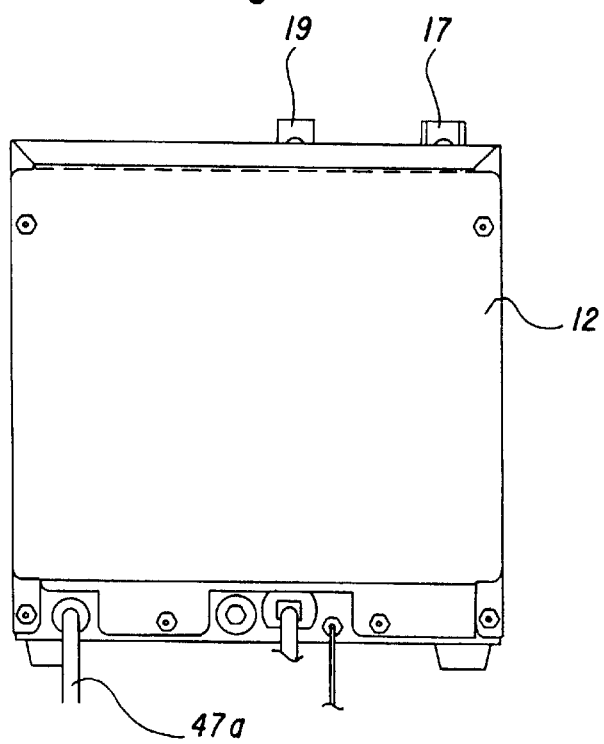
FIG. 2 is a rear view of the electrolyzed water production apparatus shown in FIG. 1.
Figure 3:
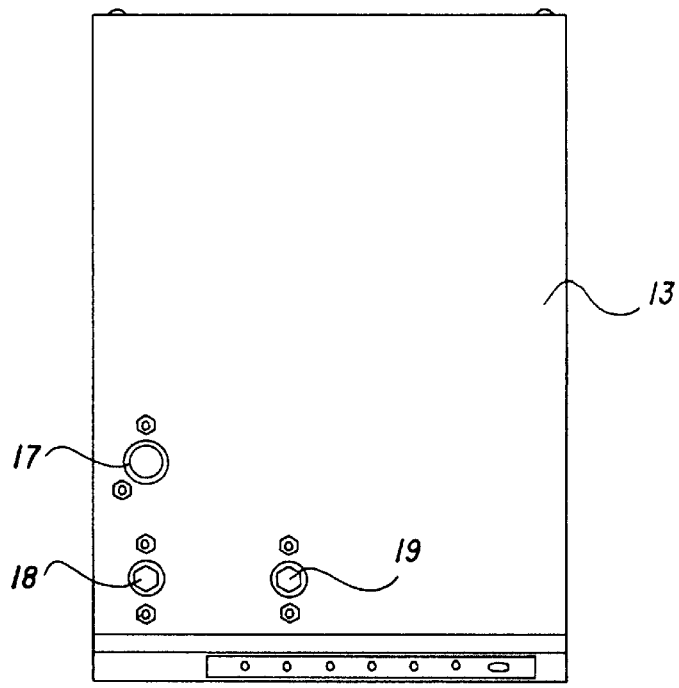
FIG. 3 is a plan view of the electrolyzed water production apparatus shown in FIG. 1.
Figure 4:
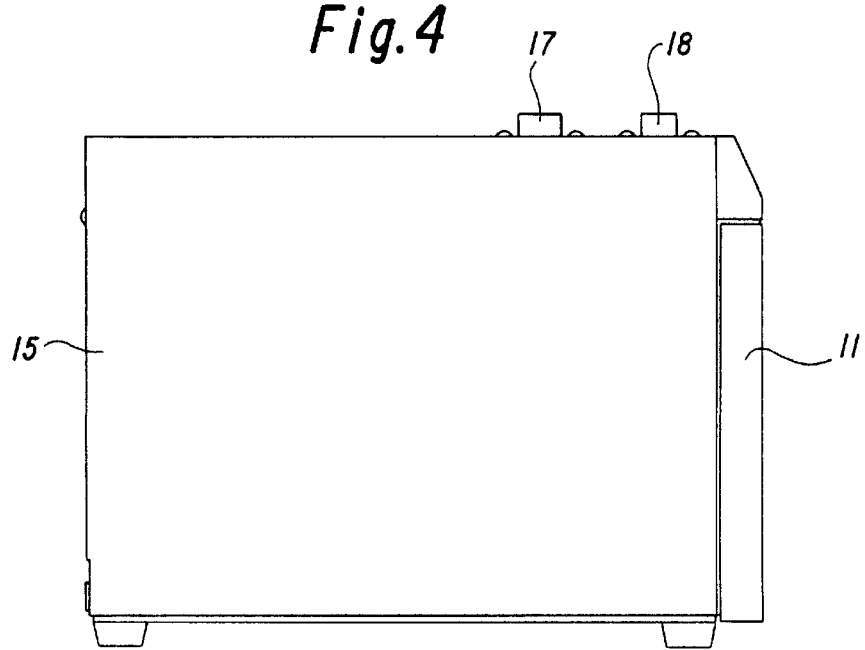
FIG. 4 is a left side view of the electrolyzed water production apparatus.
Figure 5:
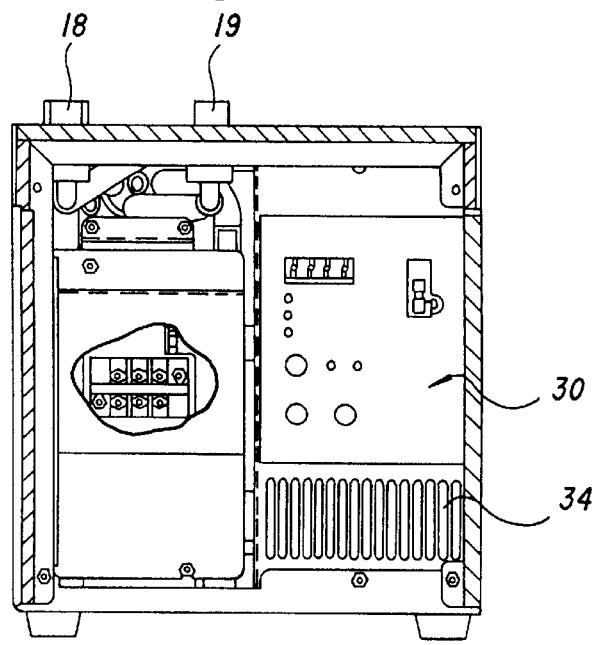
FIG. 5 is a front view of component parts assembled within a cabinet of the electrolyzed water production apparatus shown in FIG. 1, wherein a front panel of the cabinet is removed.

In FIG. 1 of the drawings, there is illustrated a cabinet 10 of an electrolyzed water production apparatus in accordance with the present invention. The cabinet 10 is formed to contain an electrolytic cell 20, component parts of a water supply system for the electrolytic cell 20 and a controller box 30, respectively shown in FIGS. 5 to 8. The cabinet 10 is composed of a front panel 11 hinged to a frame structure to be opened and closed, and a rear panel 12, an upper panel 13, a bottom panel 14 and a pair of side panels 15 and 16 respectively mounted to the frame structure in the form of an integral structure. As shown in FIGS. 2 and 3, the upper panel 13 is provided with a water supply inlet port 17 for connection to a service water conduit (not shown) and outlet ports 18, 19 for connection to discharge conduits of electrolyzed water (not shown).

Figure 8:
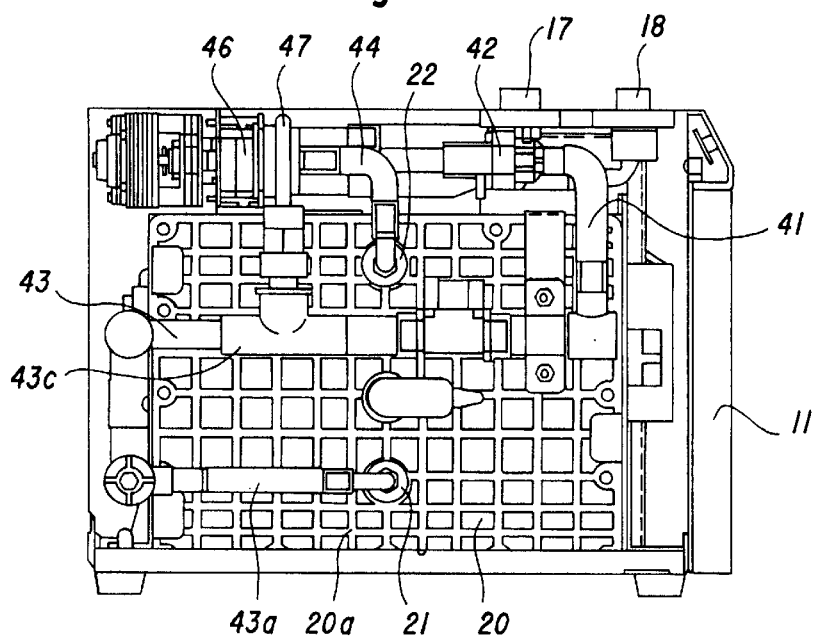
FIG. 8 is a left side view of the component parts assembled within the cabinet of the electrolyzed water production apparatus, wherein a left side panel of the cabinet is removed.

The electrolytic cell 20 includes a housing formed therein with a pair of reaction chambers isolated to one another by means of a cation permeable diaphragm and a pair of electrodes contained within the reaction chambers and opposed to one another through the diaphragm. In activation of the electrolytic cell 20, the electrodes are applied with DC voltage under control of an electric controller 33 in the controller box 30. As shown in FIG. 8, the housing of electrolytic cell 20 is provided at its opposite side walls with a pair of inlet ports 21 and a pair of outlet ports 22 respectively in open communication with the reaction chambers. The inlet ports 21 are connected to bifurcated conduits 43a and 43b of a diluted brine supply conduit 43 shown in FIG. 6, while the outlet ports 22 are connected to a pair of discharge conduits 44 and 45 shown in FIG. 7. The diluted brine supply conduit 43 is connected to a water supply conduit 41 and a saturated brine supply conduit 47 by means of a Joint conduit 43c. As shown in FIG. 8, the housing of electrolytic cell 20 is integrally formed at its opposite side walls with latticed heat absorption fins 20a.

Figure 6:
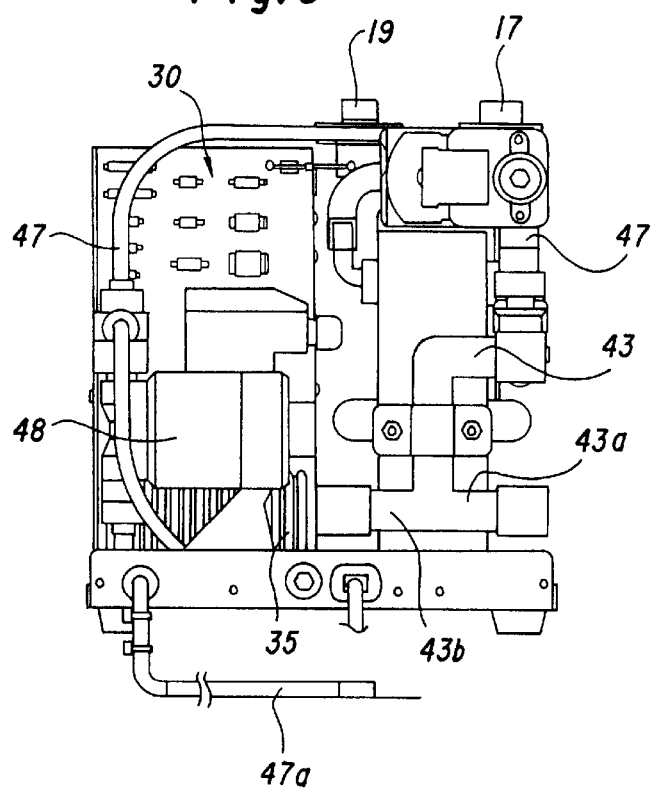
FIG. 6 is a rear view of the components parts assembled within the cabinet of the electrolyzed water production apparatus shown in FIG. 1, wherein a rear panel of the cabinet is removed.
Figure 7:
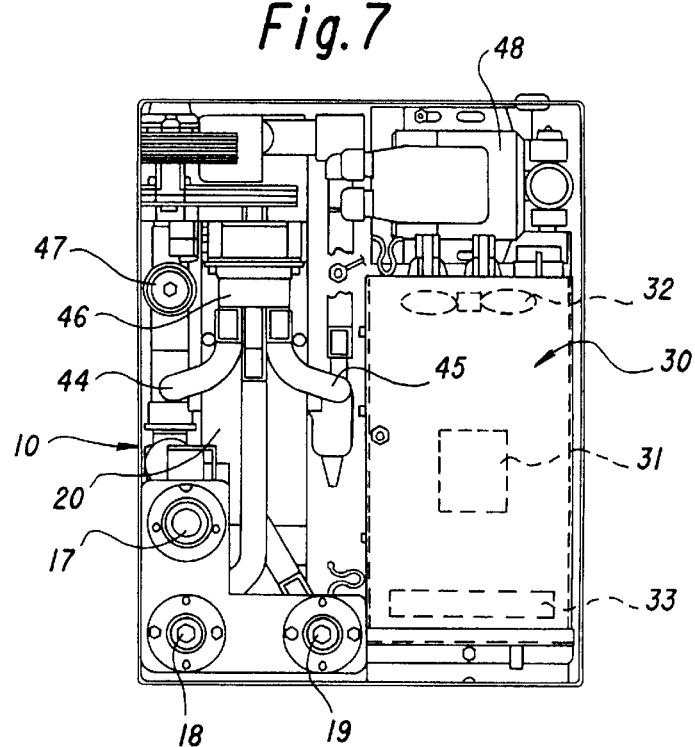
FIG. 7 is a plan view of the component parts assembled within the cabinet of the electrolyzed water production apparatus shown in FIG. 1.

The water supply conduit 41 is connected to the water supply inlet port 17, and an electromagnetic water supply valve 42 of the normally closed type is provided on the water supply conduit 41 to be opened under control of the electric controller 33 in the controller box 30. The discharge conduits 44 and 45 are connected to the outlet ports 18 and 19 through an electrically operated changeover valve 46. As shown in FIG. 6, the saturated brine supply conduit 47 is extended downwardly and connected to an outlet port of a hydraulic pump 48 placed behind the controller box 30. An extension conduit 47a is connected at its inner end to an inlet port of the hydraulic pump 48 and is extended outwardly from the cabinet 10 for connection to a saturated brine tank (not shown) at its outer end.

The changeover valve 46 is switched over by operation of an electric motor (not shown) under control of the electric controller 33 to be maintained in a first position when the electrodes of electrolytic cell 20 are applied with DC voltage in a forward direction and to be maintained in a second position when the electrodes of electrolytic cell 20 are applied with DC voltage in a reverse direction. With such control of the changeover valve 46, acid-ion water is discharged from the outlet port 18, while alkaline-ion water is discharged from the outlet port 19.

The hydraulic pump 48 is driven by an electric motor assembled therewith under control of the electric controller 33 to supply the saturated brine from the saturated brine tank into the joint conduit 43c through the extension conduit 47a and saturated brine supply conduit 47. In this embodiment, a brine concentration sensor (not shown) is provided in the diluted brine supply conduit 43 to detect concentration of the diluted brine supplied into the reaction chambers of electrolytic cell 20, and the operation of hydraulic pump 48 is controlled by the electric controller 33 in accordance with a detection value of the concentration sensor to maintain the concentration of the diluted brine in a predetermined value. In actual practices of the present invention, the brine concentration sensor may be replaced with an ammeter arranged to detect an electrolysis current in the electrolytic cell. In such a case, the operation of hydraulic pump 48 is controlled by the electric controller 33 in accordance with a detection value of the ammeter.

The controller box 30 is formed to contain therein the electric controller 33, the electric power source device 31 and its accessory parts for applying DC voltage to the electrodes of electrolytic cell 20 and the cooling blower 32 for cooling the accessory parts of power source device 31. The controller box 30 is provided at its front wall with an intake 34 shown in FIG. 5 and at its rear wall with a vent-hole 35 shown in FIG. 6 and is located adjacent one side of the electrolytic cell 20. The electric controller 33 is designed to control supply of the power to the electrodes of electrolytic cell 20 and each operation of the water supply valve 42, changeover valve 46, hydraulic pump 48 and blower 32.

During activation of the electrolyzed water production apparatus, acid-ion water and alkaline-ion water are produced in the electrolytic cell 20, and the blower 32 is driven to cause the flow of air from the intake 34 toward the vent-hole 35. Thus, the power source device 31 and its accessory parts are cooled by the flow of air, and the air exhausted from the vent-hole 35 flows toward the hydraulic pump 48 and circulates into the intake 34 through a water system composed of the electrolytic cell 20, water supply conduit 41 and discharge conduits 44, 45 of electrolyzed water. During circulation of the air, the electric motor of hydraulic pump 48 is cooled by the air, while the air is cooled by the water system.

From the above description, it will be understood that the power source device 31 and its accessory parts are sufficiently cooled by the air circulating through the water system in the interior of cabinet 10. With such arrangement of the controller box 30, it becomes unnecessary to introduce any outside air into the cabinet 10 for cooling the power source device 31 and its accessory parts. This is useful to facilitate placement and maintenance of the electrolyzed water production apparatus.

As the water system composed of the component parts indispensable for the electrolyzed water production apparatus is effectively utilized to cool the air circulating therethrough, the apparatus can be provided at a low cost without providing any additional parts for cooling the air. In the case that the controller box 30 is placed adjacent to the hydraulic pump 48, electrolytic cell 20, service water supply conduit 41 and discharge conduits 44, 45 as in the embodiment described above, the water system can be adapted to enhance cooling efficiency of the air, and the electrolyzed water production apparatus can be provided in a small size.

In addition, the air warmed by the power source device and its accessory parts during cooling thereof is utilized to warm the saturated brine flowing through the interior of the hydraulic pump 48, the water flowing through the service water supply conduit 41 and the diluted brine supplied into the electrolytic cell 20. As a result, a dissolution degree of effective chlorine during electrolysis of the diluted brine is increased to enhance the concentration of effective chlorine in electrolyzed water. Furthermore, the heat absorption fins 20a formed on the side walls of electrolytic cell 20 are useful to enhance cooling efficiency of the air.

Figure 9:
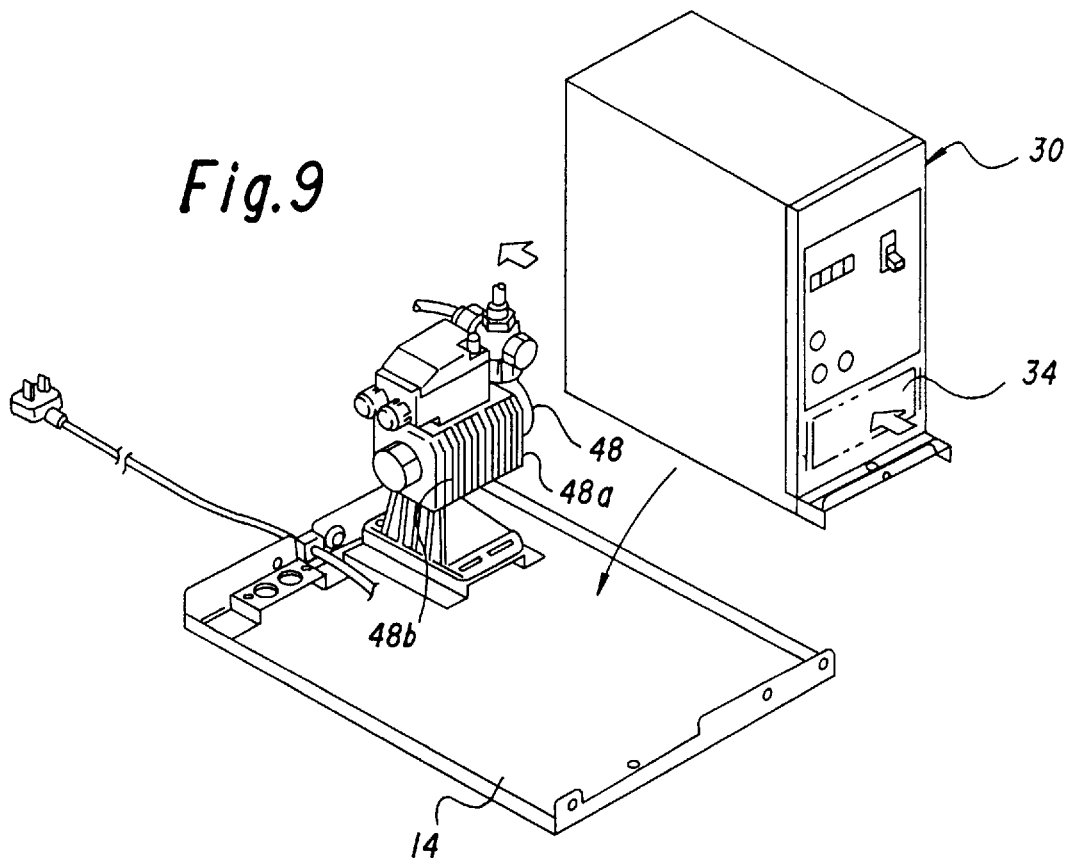
FIG. 9 is a perspective view of a hydraulic pump assembly in a modification of the electrolyzed water production apparatus shown in FIG. 1.
Figure 10:
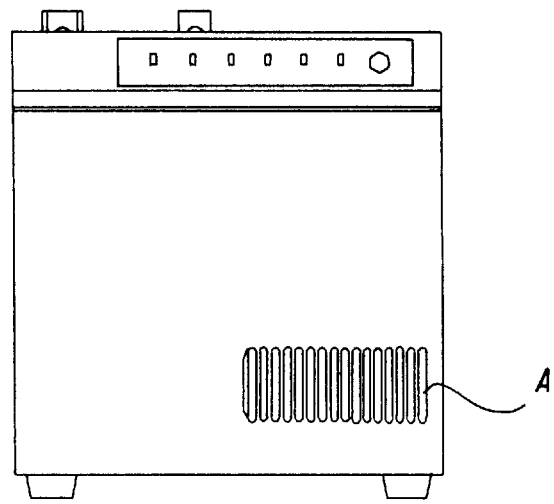
FIG. 10 is a front view of a conventional electrolyzed water production apparatus.

Although in the foregoing embodiment, the heat absorption fins 20a have been formed on the side walls of electrolytic cell 20 to enhance cooling efficiency of the air, the housing 48a of hydraulic pump 48 may be formed with heat Id absorption fins 48b as shown in FIG. 9. In actual practices of the present invention, only a portion of the water system such as an upstream portion of the water system or a portion of the electrolytic cell 20, service water supply conduit 41 or discharge conduits 44, 45 may be adapted to cool the air circulating in the interior of cabinet 10.

What is claimed is:

1. An electrolyzed water production apparatus comprising:

a closed cabinet formed to contain a controller box, an electrolytic cell placed at one side of said controller box in the interior of said cabinet, a water supply conduit for supply of brine into said electrolytic cell and a discharge conduit for discharging electrolyzed water produced by said electrolytic cell, said electrolytic cell being provided therein with a set of electrodes for producing the electrolyzed water of electrolysis of brine, said controller box being formed to contain therein an electric power source device and its accessory parts for applying DC voltage between the electrodes of said electrolytic cell and an electric blower for cooling the power source device and its accessory parts, wherein said controller box has a first side wall formed with an air intake and a second side wall formed with a vent-hole, and wherein a water system composed of at least one of said electrolytic cell, said water supply conduit and said discharge conduit is arranged in a circulation path of cooling air discharged from the vent-hole of said controller box and circulated into the air intake of said controller box through said electrolytic cell.

2. An electrolyzed water production apparatus as claimed in claim 1, wherein said electrolytic cell is arranged to cool the cooling air circulated therethrough.

3. An electrolyzed water production apparatus as claimed in claim 2, wherein said electrolytic cell is formed at its outer periphery with heat absorption fins.

4. An electrolyzed water production apparatus as claimed in claim 1, wherein a hydraulic pump for supply of water to said water system is arranged to cool the cooling air circulated therethrough.

5. An electrolyzed water production apparatus as claimed in claim 4, wherein a housing of said hydraulic pump is formed at its outer periphery with heat absorption fins.

6. An electrolyzed water production apparatus comprising:

a closed cabinet;

a controller box housed in said closed cabinet, said controller box being provided therein with an electric power source device and its accessory parts and an electric blower for cooling the power source device and its accessory parts in operation;

an electrolytic cell installed within said closed cabinet at one side of said controller box, said electrolytic cell having a set of electrodes for producing electrolyzed water by electrolysis of brine;

a water supply conduit arranged within said closed cabinet for supply of the brine into the electrolytic cell; and a discharge conduit arranged within said closed cabinet for discharging the electrolyzed water from said electrolytic cell toward the exterior;

wherein said controller box is formed at one side wall thereof with an air intake and at the other side wall thereof with a vent hole, and wherein a water system composed of at least one of said water supply conduit, said electrolytic cell and said discharge conduit is arranged in a circulation path of cooling air discharged from the vent-hole of said controller box and circulated into the air intake of said controller box through said electrolytic cell in said closed cabinet.

7. An electrolyzed water production apparatus as claimed in claim 6, wherein said water system is arranged upstream of said electrolytic cell.

* * * * *